US012593251B2

(12) United States Patent
Li et al.

(10) Patent No.: US 12,593,251 B2
(45) Date of Patent: Mar. 31, 2026

---

(54) TIMING ADVANCE IN LAYER 1/LAYER 2 INTERCELL MOBILITY

(71) Applicant: Apple Inc., Cupertino, CA (US)

(72) Inventors: Qiming Li, Beijing (CN); Yushu Zhang, Beijing (CN); Chunhai Yao, Beijing (CN); Fangli Xu, Beijing (CN); Yuqin Chen, Beijing (CN); Dawei Zhang, Saratoga, CA (US); Jie Cui, San Jose, CA (US); Manasa Raghavan, Sunnyvale, CA (US); Xiang Chen, Beijing (CN); Huaning Niu, San Jose, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 17/764,617

(22) PCT Filed: Apr. 2, 2021

(86) PCT No.: PCT/CN2021/085253
§ 371 (c)(1),
(2) Date: Oct. 6, 2022

(87) PCT Pub. No.: WO2022/205415
PCT Pub. Date: Oct. 6, 2022

(65) Prior Publication Data
US 2024/0107388 A1     Mar. 28, 2024

(51) Int. Cl.
*H04W 36/00*     (2009.01)
*H04W 56/00*     (2009.01)
(Continued)

(52) U.S. Cl.
CPC ...  *H04W 36/0061* (2013.01); *H04W 56/0045* (2013.01); *H04W 72/231* (2023.01); *H04W 74/0833* (2013.01)

(58) Field of Classification Search
CPC ......... H04W 36/0061; H04W 56/0045; H04W 72/231; H04W 74/0833; H04W 36/00725; H04W 36/0077
See application file for complete search history.

(56) References Cited

U.S. PATENT DOCUMENTS

| | | | | |
|---|---|---|---|---|
| 9,264,961 B1* | 2/2016 | Shah | ............... | H04W 36/00835 |
| 11,937,136 B2* | 3/2024 | Hong | .................. | H04W 36/362 |

(Continued)

FOREIGN PATENT DOCUMENTS

| | | |
|---|---|---|
| CN | 107889174 A | 4/2018 |
| WO | 2017196125 A2 | 11/2017 |
| WO | 2022130207 A1 | 6/2022 |

OTHER PUBLICATIONS

PCT Search Report dated Nov. 24, 2021 in connection with PCT Application No. PCT/CN2021/085253.

(Continued)

*Primary Examiner* — Schquita D Goodwin
(74) *Attorney, Agent, or Firm* — Eschweiler & Potashnik, LLC; Matthew Glause

(57)     ABSTRACT

Apparatuses, systems, and methods for determining timing advance in L1/L2 inter-cell mobility. A user equipment (UE) comprises at least one antenna, at least one radio coupled to the at least one antenna, and a processor coupled to the at least one radio. The processor is configured to receive a Time advance (TA) indicator together with a handover command from a source base station in a source coverage, wherein the TA indicator comprises information for determining a TA used for an uplink transmission with a target base station in a target coverage, the handover command is a Layer 1 handover command or a Layer 2 handover command, and the source coverage and the target coverage are identified by different Physical Cell identifiers; and in (Continued)

600

UE 6001      Source BS 6003      Target BS 6005

601 send a trigger indicator to trigger uplink transmission 603 perform the uplink transmission with the target base station 605 evaluate a TA based on the uplink transmission 607 send the evaluated TA 609 send a TA indicator together with a handover command 611 determine the TA used for the uplink transmission 613 determine uplink timing for the uplink transmission 615 Perform the uplink transmission at the determined uplink timing response to the handover command, determine the TA used for the uplink transmission with the target base station based on the information.

27 Claims, 8 Drawing Sheets

(51) Int. Cl.
  *H04W 72/231*    (2023.01)
  *H04W 74/0833*   (2024.01)

(56)                  References Cited

U.S. PATENT DOCUMENTS

| | | | | |
|---|---|---|---|---|
| 2016/0381611 A1* | 12/2016 | Uchino | ........... | H04W 36/00725 |
| | | | | 370/331 |
| 2018/0020472 A1 | 1/2018 | Lin et al. | | |
| 2019/0124566 A1* | 4/2019 | Liu | ........................ | H04W 56/00 |
| 2019/0297537 A1 | 9/2019 | Tsai | | |
| 2019/0350003 A1* | 11/2019 | Jang | ...................... | H04L 1/0005 |
| 2020/0314913 A1* | 10/2020 | Rastegardoost | ...... | H04W 74/04 |
| 2020/0350977 A1* | 11/2020 | Ryu | .................. | H04W 74/0833 |
| 2020/0351734 A1* | 11/2020 | Purkayastha | ....... | H04W 36/302 |
| 2021/0022057 A1 | 1/2021 | Sabouri-Sichani | | |
| 2021/0028848 A1* | 1/2021 | Tsai | ...................... | H04W 16/28 |
| 2021/0219194 A1* | 7/2021 | Zhang | ................... | H04W 24/08 |
| 2021/0329520 A1* | 10/2021 | Lin | ................... | H04W 36/0061 |
| 2022/0132587 A1* | 4/2022 | Agiwal | ............... | H04W 36/185 |
| 2022/0201583 A1* | 6/2022 | Kumar | .................. | H04W 76/11 |
| 2022/0264680 A1* | 8/2022 | Kim | ...................... | H04W 76/15 |
| 2023/0189180 A1* | 6/2023 | Yuan | ................. | H04W 56/0045 |
| | | | | 370/350 |
| 2025/0048291 A1* | 2/2025 | Shin | .................. | H04W 56/0045 |

OTHER PUBLICATIONS

PCT Written Opinion dated Dec. 28, 2021 in connection with PCT Application No. PCT/CN2021/085253.

"China Telecom Running CR for instruction of even further mobility enhancement in E-UTRAN"; 3GPP; TSG-RAN2; Meeting #109 electronic; R1-2001752; Mar. 6, 2020(Mar. 6, 2020).

"Asustek Discussion on multi-beam operation"; 3GPP; TSG RAN WG1; #103-e; R1-2009155; Nov. 13, 2020(Nov. 13, 2020).

3rd Generation Partnership Project; Technical Specification Group Radio Access Network; NR; Requirements for support of radio resource management; (Release 17); 3GPP TS 38.133 V17.0.0 (Dec. 2020).

5G; NR; Radio Resource Control (RRC); Protocol specification; (3GPP TS 38.331 version 16.4.1 Release 16); ETSI TS 138 331 V16.4.1 (Apr. 2021).

3rd Generation Partnership Project; Technical Specification Group Radio Access Network; NR; Requirements for support of radio resource management (Release 16); 3GPP TS 38.133 V16.5.0 (Sep. 2020); http://www.3gpp.org.

European Extended Search Reported dated Nov. 6, 2024 in connection with Application No. 21934072.6.

* cited by examiner

700

UE 7001                    Source BS 7003                    Target BS 7005

709 send a TA indicator together
    with a handover command 711 determine the TA used for
    the uplink transmission 713 determine uplink timing for
    the uplink transmission 715  Perform the uplink transmission at the determined uplink timing

800 receive a Time advance (TA) indicator together with a handover command from a source base station in a source coverage, the TA indicator comprises information for determining a TA used for an uplink transmission with a target base station in a target coverage, wherein the handover command is a Layer 1 handover command or a Layer 2 handover command, and the source coverage and the target coverage are identified by different Physical Cell identifiers 801 in response to the handover command, determine the TA used for the uplink transmission with the target base station based on the information 803 determine uplink timing for the uplink transmission with the target base station in the target coverage based on the determined TA and an evaluation of a downlink reference signal from the target base station in the target coverage 805 perform the uplink transmission with the target base station in the target coverage at the determined uplink timing 807

*FIG. 8*

900 send to a user equipment (UE) a Time advance (TA) indicator together with a handover command in a source coverage, wherein the TA indicator comprises information for determining by the UE a TA used for an uplink transmission with a target base station in a target coverage, wherein the handover command is a Layer 1 handover command or a Layer 2 handover command, and the source coverage and the target coverage are identified by different Physical Cell identifiers   901

*FIG. 9*

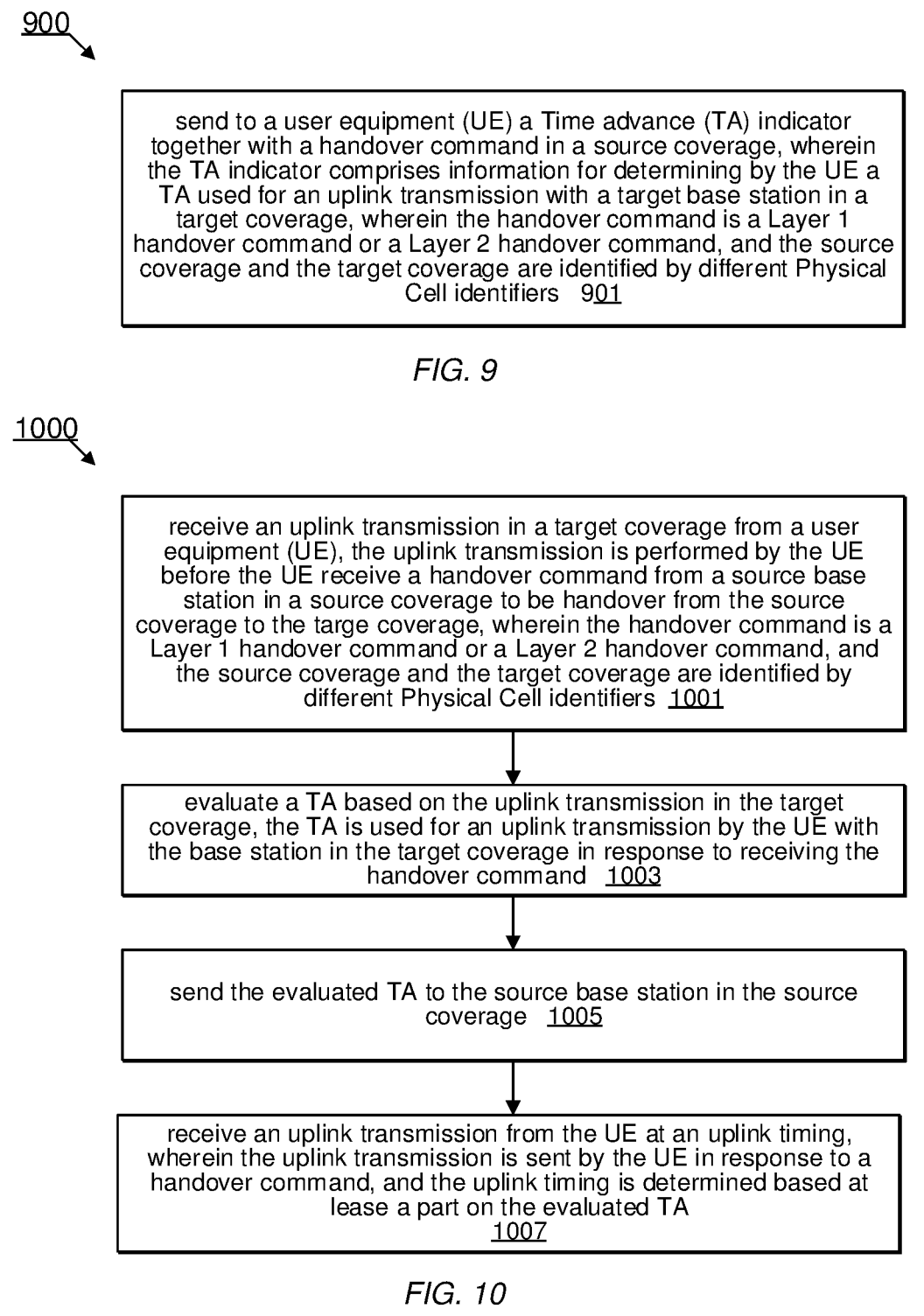

1000 receive an uplink transmission in a target coverage from a user equipment (UE), the uplink transmission is performed by the UE before the UE receive a handover command from a source base station in a source coverage to be handover from the source coverage to the targe coverage, wherein the handover command is a Layer 1 handover command or a Layer 2 handover command, and the source coverage and the target coverage are identified by different Physical Cell identifiers 1001 evaluate a TA based on the uplink transmission in the target coverage, the TA is used for an uplink transmission by the UE with the base station in the target coverage in response to receiving the handover command   1003 send the evaluated TA to the source base station in the source coverage   1005 receive an uplink transmission from the UE at an uplink timing, wherein the uplink transmission is sent by the UE in response to a handover command, and the uplink timing is determined based at lease a part on the evaluated TA
1007

*FIG. 10*

TIMING ADVANCE IN LAYER 1/LAYER 2 INTERCELL MOBILITY

This application is a National Phase entry application of International Patent Application No. PCT/CN2021/085253, filed Apr. 2, 2021, entitled "TIMING ADVANCE IN LAYER 1/LAYER 2 INTERCELL MOBILITY", the contents of which are herein incorporated by reference in their entirety.

FIELD

The present application relates to wireless communication including apparatus, systems, and methods for determining a timing advance (TA) in layer 1/layer 2 (L1/L2) inter-cell mobility.

BACKGROUND

In 5G R17, L1/L2 based inter-cell mobility is to be supported. Compared with legacy handover, which is triggered by RRC reconfiguration, L1/L2 based handover can reduce handover latency since no RRC command is involved. The handover can be triggered directly by L1/L2 command.

Another difference between L1/L2 handover and the legacy handover is that there may not be a Physical Random Access Channel (PRACH) procedure in L1/L2 handover. User equipment (UE) is expected to be able to directly connect with target cell after receiving the L1/L2 handover command. In legacy handover, timing advance (TA) for the new cell can be acquired via PRACH procedure to the target cell.

However, in L1/L2 handover, without PRACH procedure, UE cannot have information about accurate TA which to be used in the target cell transmission.

SUMMARY

Aspects relate to apparatuses, systems, and methods for determining a timing advance in L1/L2 inter-cell mobility.

According to the techniques described herein, together with the L1/L2 handover command, a TA indicator including for determining by a UE a TA used for an uplink transmission with a target base station in a target coverage is sent from source cell to the UE, and the UE may determine a TA according to the TA indicator.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various aspects is considered in conjunction with the following drawings, in which:

FIG. 8 illustrates an example flow chart of a method performed by a UE according to some aspects.

FIG. 9 illustrates an example flow chart of a method performed by a source base station according to some aspects.

FIG. 10 illustrates an example flow chart of a method performed by a target base station according to some aspects.

Figure 1:
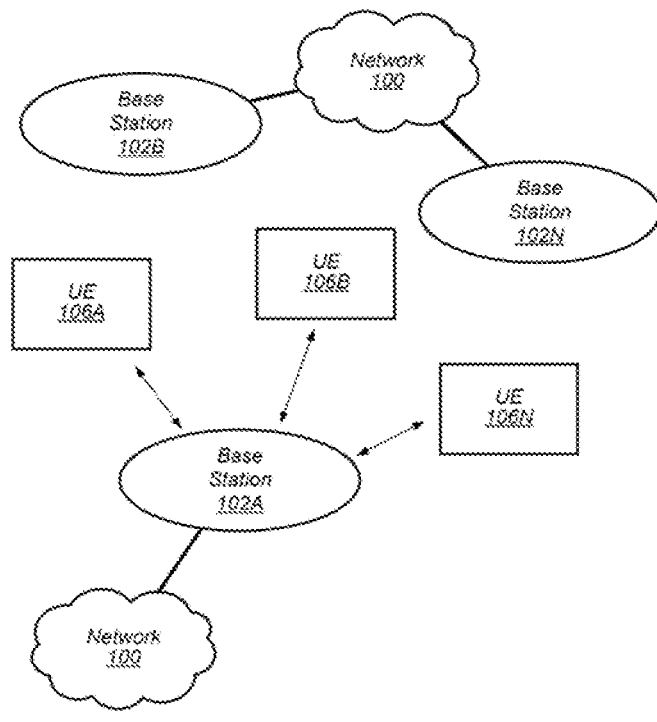
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel"

as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one aspect, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
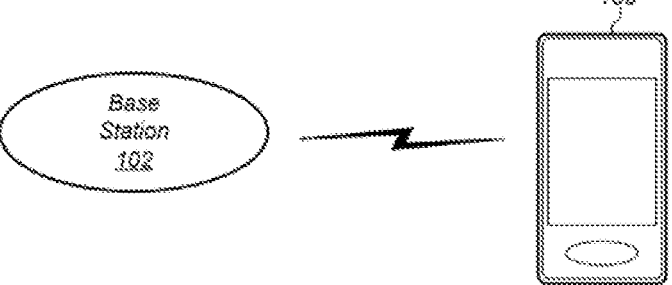
FIG. 2 illustrates a base station (BS) in communication with a user equipment (UE) device, according to some aspects.

FIGS. 1 and 2—Communication System

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In one aspect, base station 102A may be a next generation base station, e.g., a 5G New Radio (5G NR) base station, or "gNB". In one aspect, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In one aspect, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In one aspect, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
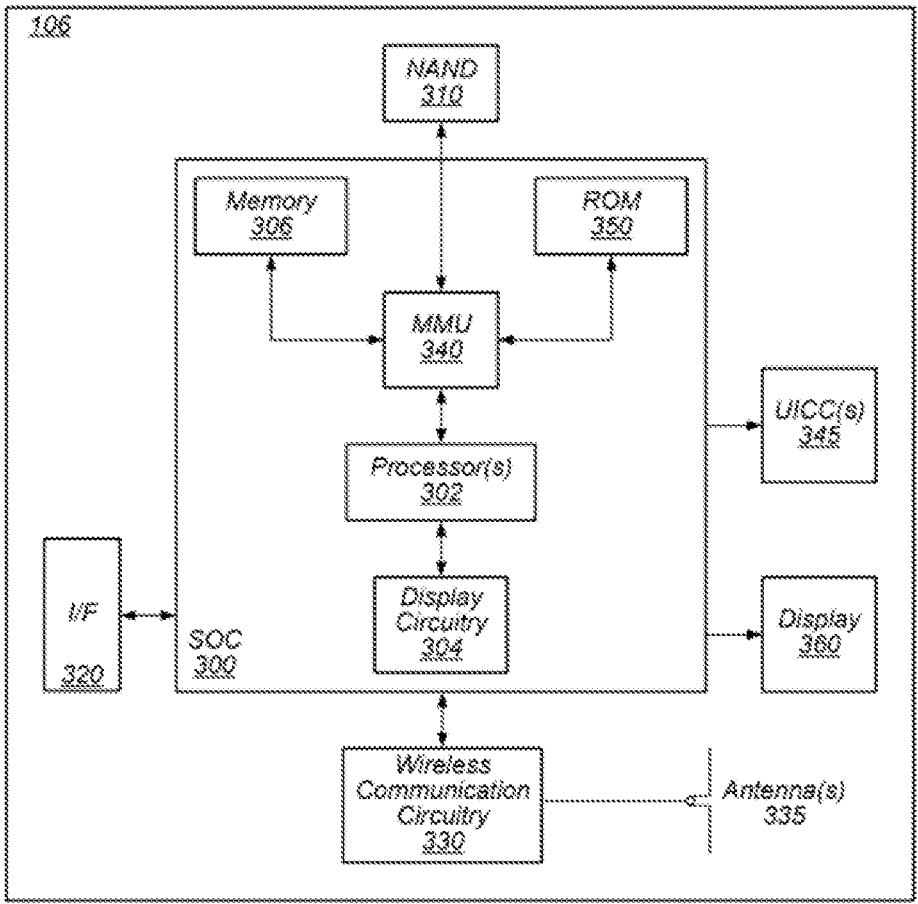
FIG. 3 illustrates an example block diagram of a UE, according to some aspects.

FIG. 3—Block Diagram of a UE

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In one aspect, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In one aspect, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in one aspect, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In one aspect, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300,

304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
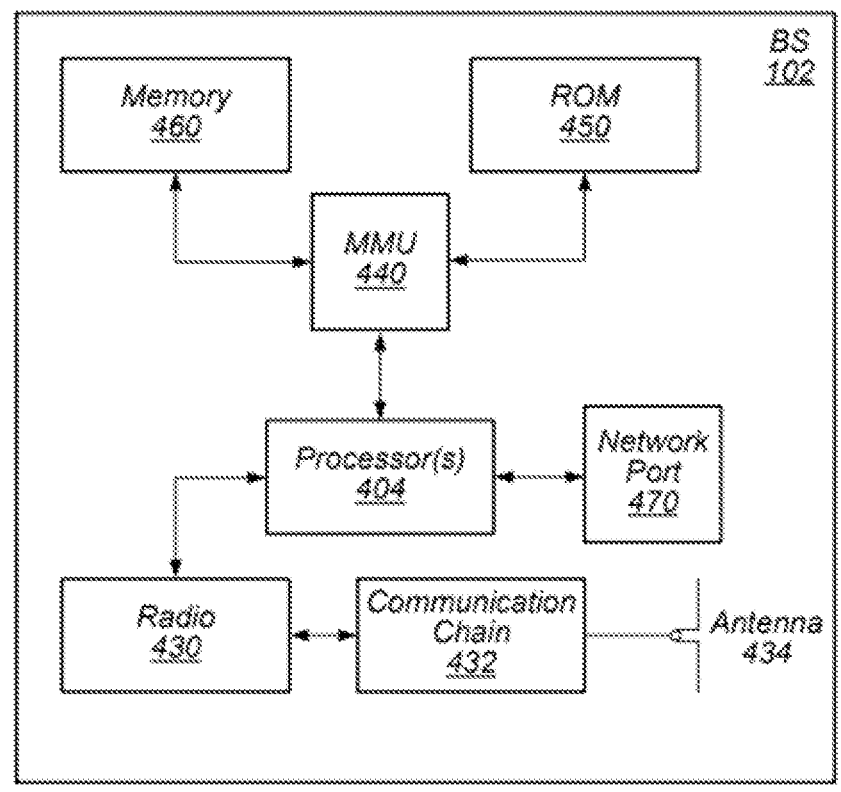
FIG. 4 illustrates an example block diagram of a BS, according to some aspects.

FIG. 4—Block Diagram of a Base Station

FIG. 4 illustrates an example block diagram of a base station 102, according to some aspects. It is noted that the base station of FIG. 4 is merely one example of a possible base station. As shown, the base station 102 may include a processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In one aspect, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
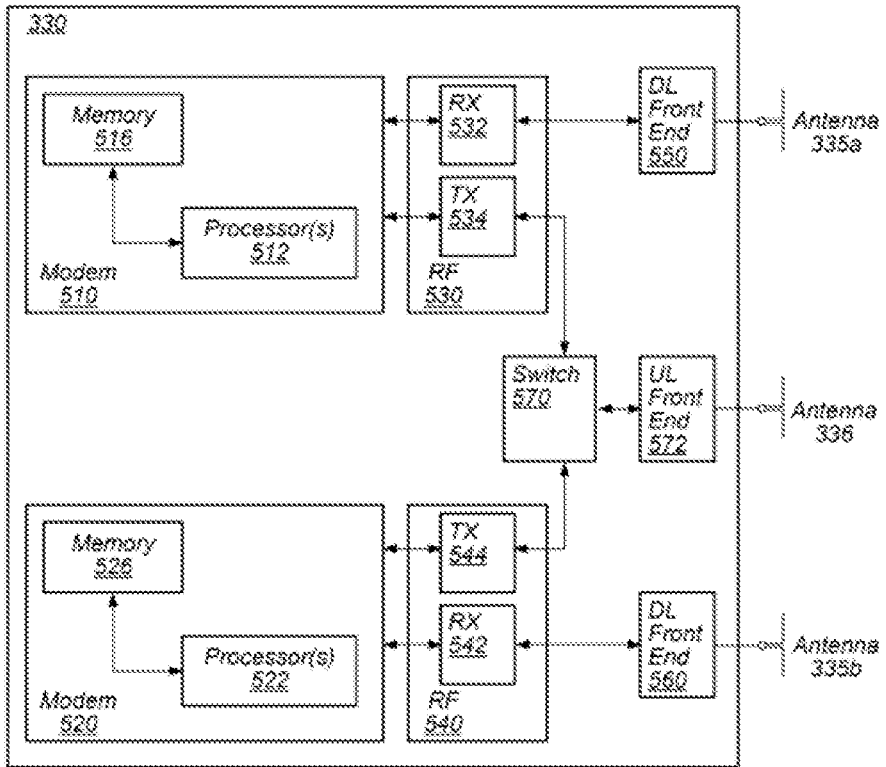
FIG. 5 illustrates an example block diagram of cellular communication circuitry, according to some aspects.

FIG. 5—Block Diagram of Cellular Communication Circuitry

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In one aspect, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In one aspect, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In one aspect, receive circuitry 542 may be in communication with DL front end 560, which may include circuitry for receiving radio signals via antenna 335*b*.

In one aspect, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition)

the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In one aspect, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In one aspect, the cellular communication circuitry 330 may also not include the switch 570, and the RF front end 530 or the RF front end 540 may be in communication, e.g., directly, with the UL front end 572.

Solution 1—TA Evaluation Based on UE UL Transmission

Firstly, an overall procedure for uplink transmission based on TA evaluation comprises the following steps:

Step 1: before L1/L2 handover command is sent, network sends an indicator to UE to trigger an uplink transmission to the target cell.

Step 2: after receiving the indicator, UE shall perform uplink (UL) transmission to the target cell accordingly.

Step 3: target cell evaluates the TA based on the UL transmission.

Step 4: target cell forwards the TA information to the source cell. In one aspect, for the transmission of TA information, a new message on Xn interface regarding TA information may be added. Number of bits used for the TA information can be flexible depends on deployment.

Step 5: the source cell indicates the TA in the L1/L2 handover command.

Step 6: after receiving L1/L2 handover command, UE should apply the TA in the uplink.

For the uplink transmission indicator in step 1, there may be three options:

Option 1: DCI (Downlink Control Information) e.g., to trigger aperiodic Sounding Reference Signal (SRS) transmission;

Option 2: Medium Access Control-Control Element (MAC-CE), e.g., to trigger semi-persistent SRS transmission; and Option 3: Physical Downlink Control Channel (PDCCH) order, e.g., to trigger PRACH preamble transmission. In one aspect, a target cell SSB can be indicated.

For SRS, a Physical Cell Identifier (PCI) can be configured by higher layer signaling for a SRS resource or a SRS resource set or indicated by DCI (option 1) or MAC CE (option 2).

Correspondingly, for uplink signal in step 2, the UE may use the following options for the UL transmission:

Option 1: SRS; and

Option 2: PRACH preamble

In one aspect, under either of the above options, the signal (e.g., the SRS or the PRACH preamble) needs to be preconfigured via Radio Resource Control (RRC) before the handover procedure. Then the uplink transmission of the signal can be triggered according to step 1.

In one aspect, for the SRS option, a second sequenceId can be configured, which can be used for SRS signal generation when the SRS signal is sent to the target cell transmission in the target cell.

In step 5, the TA may be indicated via the following two options:

Option 1: DCI together with L1 handover command; or

Option 2: MAC-CE together with L2 handover command.

In step 5, the TA information may be:

Option 1: absolute TA value, wherein, the number of bits used for TA indicator can be flexible depends on deployment;

Option 2: relative TA value, wherein the relative TA value may be obtained by comparing TA1 and TA2, and the network can indicate the difference between TA1 and TA2 and send the delta as relative TA value the to the UE.

UE can use the TA to determine uplink (UL) timing so as to perform uplink transmission to the target cell upon receiving the handover command. UL timing can be determined based on evaluation of Downlink Reference Signal (DL RS) from the target cell plus existing the new TA command indicated by the network. UE should follow existing T e requirements defined in TS38.133 clause 7.1.

Figure 6:
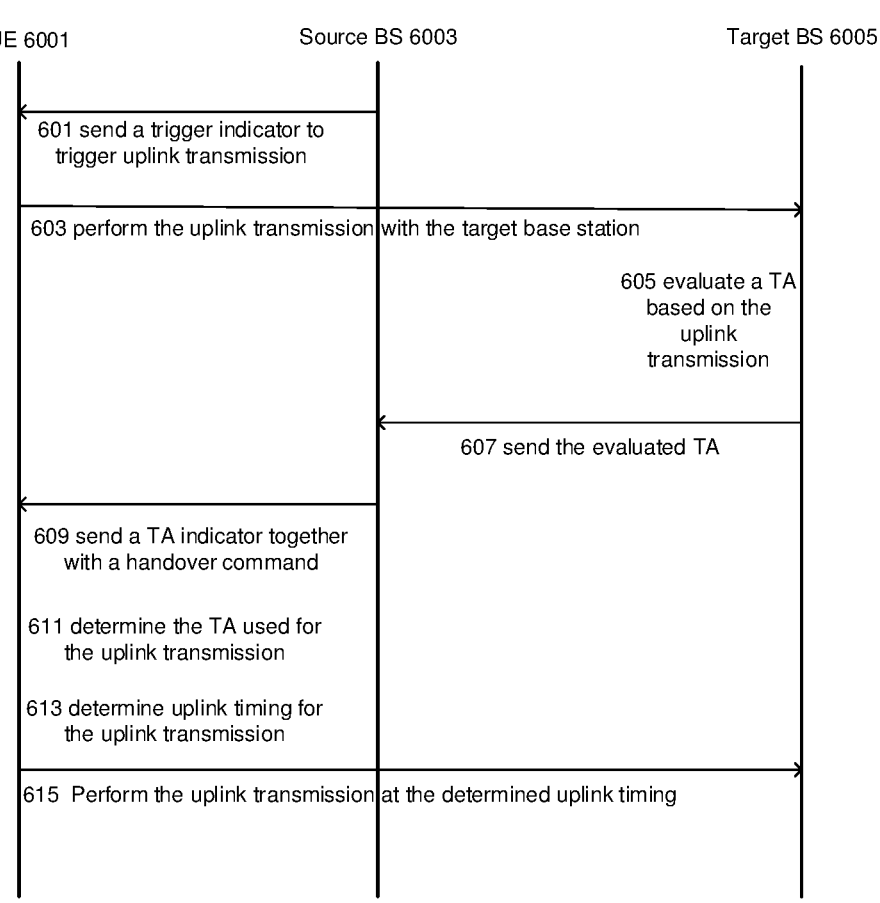
FIG. 6 illustrates an example flow chart of a method based on TA evaluation according to some aspects.

FIG. 6—Procedure Based on TA Evaluation

FIG. 6 illustrates an example flow chart of operations of a method 600 based on TA evaluation according to some aspects. As shown, the method may be performed by a user equipment 6001, a source base station 6003 in a source cell and a target base station 6005 in a target cell. The user equipment 6001 is to be handed over from the source base station 6003 in the source cell to the target base station 6005 in the target cell. The source base station 6003 and the target base station 6005 are different base stations in different cells identified by different physical cell identities (PCIs).

As shown in FIG. 6, the method 600 may begin at 601, where the source base station 6003 sends to the UE 6001 a trigger indicator to trigger the UE 6001 to perform an uplink transmission with the target base station 6005 in the target cell.

In one aspect, the trigger indicator may be sent by the source base station 6003 before a handover command is sent from the source base station 6003 to the UE 6001. The handover command may indicate a change of the Physical Cell Identifier (PCI), which indicate the UE 6001 is to be handed over from a source cell to a target cell.

In one aspect, the handover command may be a Layer 1 handover command. In such a case, the trigger indicator may be transmitted via DCI to trigger aperiodic Sounding Reference Signal (SRS) transmission.

In another aspect, the handover command may be a Layer 2 handover command. In such a case, the trigger indicator may be transmitted via MAC-CE to trigger semi-persistent SRS transmission.

For SRS, the PCI for the target cell may be configured by higher layer signaling to obtain an SRS resource or an SRS resource set. The PCI for the target cell may be indicated by DCI or by MAC CE.

In one aspect, the trigger indicator may be transmitted via a PDCCH order, e.g., to trigger PRACH preamble transmission. In such a case, SS/PBCH block (SSB) for the target cell may be indicated in the PDCCH order.

The method 600 may proceed to 603, where the UE 6001 performs the uplink transmission with the target base station 6005 in the target cell in response to the trigger indicator.

In a case that the handover command to be sent is the Layer 1 handover command, the UE 6001 may perform the aperiodic SRS transmission. In a case that the handover command to be sent is the Layer 2 handover command, the UE 6001 may perform the semi-persistent SRS transmission.

In one aspect, no matter the handover command to be sent is the Layer 1 handover command or the Layer 2 handover command, the UE 6001 may send a PRACH preamble.

The signal to be transmitted to the target cell, e.g., the SRS or the PRACH preamble, may be preconfigured via Radio Resource Control (RRC) before the uplink transmission of the signal is performed.

For SRS, a second sequenceId may be configured, which can be used for SRS signal generation when the SRS signal is sent to the target base station 6005 in the target cell.

At 605, the target base station 6005 evaluates a TA based on the uplink transmission in the target cell. The target base station 6005 may compute the TA for the UE 6001 based on the received SRS or the received PRACH preamble.

Then at 607, the target base station 6005 sends the evaluated TA to the source base station 6003 in the source cell.

The method 600 may further comprise 609, where the source base station 6003 sends to the UE 6001 a TA indicator together with a handover command in the source cell. As described above, the handover command may be the Layer 1 handover command or the Layer 2 handover command. The TA indicator comprises information for determining by the UE 6001 a Time advance (TA) used for an uplink transmission with the target base station 6005 in the target cell.

The TA indicator may be sent by DCI for the Layer 1 handover command, or by MAC-CE for the Layer 2 handover command. In some cases, the TA indicator and the handover command may be sent in different messages via DCI or MAC-CE. For example, the TA indicator may be sent in one message, and the handover command is sent in another message concurrently.

In some cases, the TA indicator and the handover command may be sent in the same messages via DCI or MAC-CE. For example, the handover command may be sent via DCI or MAC-CE, and some bits in the DCI or MAC-CE are used to include the TA indicator.

In one aspect, the TA value may be an absolute TA value indicting the evaluated TA. In one aspect, the TA value may be a relative TA value, which indicates difference between a current TA (referred as TA1) for the source base station 6003 in the source cell and the evaluated TA (referred as TA2) for the target base station 6005 in the target cell. The indicating of the relative TA value may need less bits and save resources.

Then the method may proceed to 611, where in response to the handover command, the UE 6001 determines the TA used for the uplink transmission with the target base station 6005 based on the information comprised in the TA indicator.

According to the TA indicator sent together with the handover command, the UE 6001 may determine the TA to be used differently. The TA to be used may be the evaluated TA, the relative TA plus TA1, the fixed TA, or same as TA1. Or, the UE 6001 may fall back to the legacy PRACH procedure to obtain the TA to be used.

Then the method may proceed to 613, the UE 6001 may determine uplink timing for the uplink transmission with the target base station 6005 in the target cell based on the determined TA and an evaluation of a downlink reference signal from the target base station 6005 in the target cell.

In one aspect, the uplink timing for the uplink transmission with the target base station 6005 in the target cell may be determined by adding the determined TA and the evaluation of a downlink reference signal from the target base station 6005 in the target cell, wherein the evaluation of the downlink reference signal from the target base station 6005 in the target cell indicates expected timing computed based on the downlink reference signal from the target base station 6005 in the target cell. When determining the uplink timing, the UE 6001 may follow existing $T_e$ requirements defined in TS38.133 clause 7.1.

Then the method may proceed to 615, the UE 6001 may perform the uplink transmission with the target base station 6005 at the determined uplink timing.

Solution 2—Simple TA Indication

As compared to the solution based on TA evaluation, in some circumstances, the network can directly provide rough TA information to the UE without TA evaluation. Thus, UE doesn't need to perform uplink transmission to target cell.

In one aspect, the rough TA may be TA=0. This TA information may apply for small cell deployment.

In one aspect, the rough TA may be the same TA as that is being used in the source cell. This TA information may apply for colocated deployment.

Similarly, the indicator can be sent via DCI or MAC-CE. The downlink timing reference signal may be used to derive uplink timing.

For example, if TA=0 is indicated, then the UL timing should be determined based on evaluation of the DL RS from the target cell. UE may follow existing T e requirements defined in TS38.133 clause 7.1.

If the same TA as that is being used in the source cell is indicated, UL timing may be determined based on evaluation of DL RS from target cell plus the existing TA. UE may follow existing $T_e$ requirements defined in TS38.133 clause 7.1.

Figure 7:
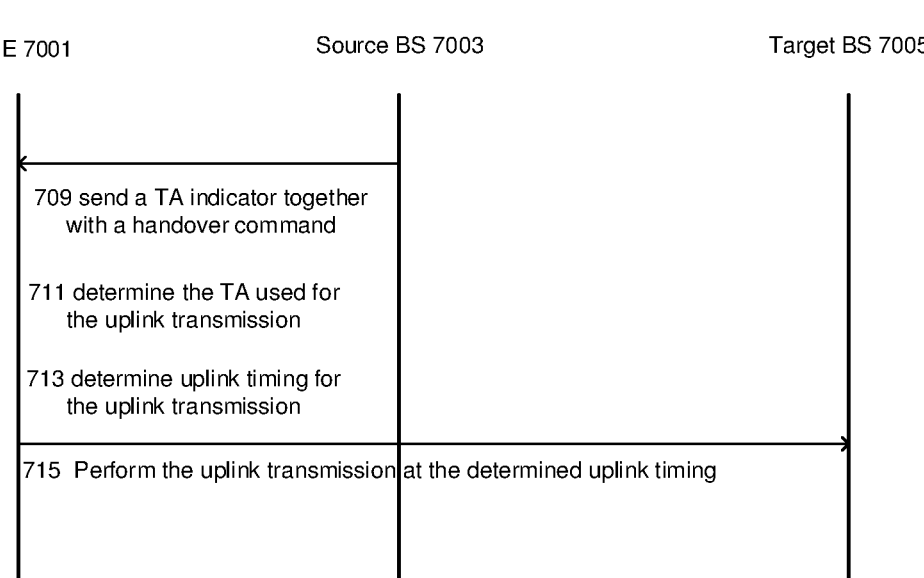
FIG. 7 illustrates an example flow chart of a method based on simple TA indication according to some aspects.

FIG. 7—Procedure Based on Simple TA Indication

FIG. 7 illustrates an example flow chart of operations of a method 700 based on simple TA indication according to some aspects. As shown, the method may be performed by a user equipment 7001, a source base station 7003 in a source cell and a target base station 7005 in a target cell. The user equipment 7001 is to be handover from the source base station 7003 in the source cell to the target base station 7005 in the target cell. The source cell and the target cell are corresponding to different PCIs.

In some circumstances for small cell deployment, the source base station 7003 and the target base station 7005 cover different cells but the cell radius of them are small. That is, the handover command to be sent may indicate a handover between different cells of different base stations with small cell radius.

In some other circumstances for co-located deployment, the handover command to be sent may indicate a handover between different sectors of a cell of the same base station. That is, the source base station 7003 and the target base station 7005 is the same base station with different sectors identified by different PCIs.

In these circumstances, the TA evaluation as described with operations 601-607 may not be need. Instead, roughly TA indication may be used.

As shown the method 700 comprises 709, where the source base station 7003 sends to the UE 7001 a TA indicator together with a handover command in the source cell. As described above, the handover command may be the Layer 1 handover command or the Layer 2 handover command. The TA indicator comprises information for determining by the UE 7001 a Time advance (TA) used for an uplink transmission with the target base station 7005 in the target cell.

In the circumstances for small cell deployment, the TA indicator may indicate that TA=0.

In the circumstances for co-located deployment, the TA indicator may indicate that the TA is the same as the current TA of the source sector.

In one aspect, the TA indicator may contain the specific TA value. In some embodiment, the TA indicator only indicate UE to use a corresponding TA value.

As shown in FIG. 7, the method 700 proceeds to 711, where in response to the handover command, the UE 7001 determines the TA used for the uplink transmission with the target base station 7005 based on the information comprised in the TA indicator.

Then the method may proceed to 713, the UE 7001 may determine uplink timing for the uplink transmission with the target base station 7005 in the target cell based on the determined TA and an evaluation of a downlink reference signal from the target base station 7005 in the target cell.

Then the method may proceed to 715, the UE 7001 may perform the uplink transmission with the target base station 7005 at the determined uplink timing.

The operations 709-715 are similar as those operations 609-615, hence, the detailed explanation of each operations is omitted.

Solution 3—Fixed TA=0

In one aspect, the network may not need to indicate TA information. UE then assumes TA=0. In this case low Modulation and Coding Scheme (MCS) and good side condition (e.g. above X dB, where X=−2, or 0, or etc.) is expected.

UE may apply TA=0 until it receives new TA command from the target cell. This can reduce the complexity of this feature at the cost of some uplink performance degradation right after handover occurs.

Similarly, the downlink timing reference may be used to derive uplink timing. UL timing may be determined based on evaluation of DL RS from target cell. UE may follow existing T e requirements defined in TS38.133 clause 7.1.

For a specific procedure based on the fixed TA=0, the operations may be the same as those shown in FIG. 7, thus the detailed explanation has been omitted. In such a case, the TA indicator may indicate the UE to use TA=0. Or there is no TA indicator contained in the handover command or along with the handover command, then the UE always uses TA=0 to perform uplink transmission with the target base station a target cell.

Solution 4—Fallback to PRACH

In case the network cannot guarantee the uplink timing in the target cell, the network can also send an indicator to the UE to trigger legacy PRACH procedure.

For instance, in solution 1 the source cell expects TA information from the target cell in step 4. But somehow there is no feedback from target cell. The source cell may choose to let UE trigger legacy PRACH procedure to acquire proper TA.

The fallback to legacy PRACH can be:

Option 1: indicated by DCI together with L1 handover command

Option 2: indicated by MAC-CE together with L2 handover command

Option 3: triggered as default scheme. e.g. applies if there is no TA information carried by the L1/L2 handover command.

Similarly, the downlink timing reference may be used to derive uplink timing. UL timing should be determined based on evaluation of DL RS from target cell. UE may follow existing T e requirements defined in TS38.133 clause 7.1.

For a specific procedure based on the fallback to PRACH, the operations may be the same as those shown in FIG. 6 or 7, except for that e.g., in 607, no evaluated TA information is successfully received from the target cell. The detailed explanation has been omitted. In such a case, the TA indicator may indicate the UE to fall back to the legacy PRACH procedure to obtain proper TA. Or, if there is no TA indicator contained in the handover command or along with the handover command, then the UE fall back, by default, to the legacy PRACH procedure.

FIG. 8—a Method Performed by a UE

FIG. 8 illustrates an example flow chart of a method 800 performed by a UE (e.g., UE 6001 or 7001) according to some aspects.

As shown in FIG. 8, the method 800 may comprise 801, the UE receives a Time advance (TA) indicator together with a handover command from a source base station in a source coverage, where the TA indicator comprises information for determining a TA used for an uplink transmission with a target base station in a target coverage, the handover command is a Layer 1 handover command or a Layer 2 handover command, and the source coverage and the target coverage are identified by different Physical Cell identifiers. The source coverage and the target coverage may be different cells or different sectors.

The method 800 may further comprise 803, where, in response to the handover command, the UE determines the TA used for the uplink transmission with the target base station based on the information.

The method 800 may further comprise 805, the UE determines uplink timing for the uplink transmission with the target base station in the target coverage based on the determined TA and an evaluation of a downlink reference signal from the target base station in the target coverage.

The method 800 may further comprise 807, the UE performs the uplink transmission with the target base station in the target coverage at the determined uplink timing.

FIG. 9—a Method Performed by a Source Base Station

FIG. 9 illustrates an example flow chart of a method 900 performed by a source base station (e.g., source base station 6003 or 7003) according to some aspects.

As shown in FIG. 9, the method 900 may comprise 901, the base station send to a user equipment (UE) a Time advance (TA) indicator together with a handover command in a source coverage, wherein the TA indicator comprises information for determining by the UE a TA used for an uplink transmission with a target base station in a target coverage, wherein the handover command is a Layer 1 handover command or a Layer 2 handover command, and the source coverage and the target coverage are identified by different Physical Cell identifiers.

FIG. 10—a Method Performed by a Target Base Station

FIG. 10 illustrates an example flow chart of a method 1000 performed by a target base station (e.g., target base station 6005 or 7005) according to some aspects.

As shown in FIG. 10, the method 1000 may comprise 1001, where the target base station receives an uplink transmission in a target coverage from a user equipment (UE), the uplink transmission is performed by the UE before the UE receive a handover command from a source base station in a source coverage to be handover from the source coverage to the target coverage, wherein the handover command is a Layer 1 handover command or a Layer 2 handover command, and the source coverage and the target coverage are identified by different Physical Cell identifiers.

The method 1000 may further comprise 1003, the target base station evaluates a TA based on the uplink transmission in the target coverage, the TA is used for an uplink transmission by the UE with the base station in the target coverage in response to receiving the handover command.

The method 1000 may further comprise 1005, the target base station sends the evaluated TA to the source base station in the source coverage.

The method 1000 may further comprise 1007, the target base station receive an uplink transmission from the UE at an uplink timing, wherein the uplink transmission is sent by the UE in response to a handover command, and the uplink timing is determined based at lease a part on the evaluated TA.

In various aspects, some of the elements of the methods shown may be performed concurrently, in a different order than shown, may be substituted for by other method elements, or may be omitted. Additional elements may also be performed as desired.

In the following further exemplary aspects are provided.

One set of aspects provides a user equipment (UE), comprising at least one antenna, at least one radio coupled to the at least one antenna, and a processor coupled to the at least one radio. The processor is configured to: receive via the at least one radio a Time advance (TA) indicator together with a handover command from a source base station in a source coverage, wherein the TA indicator comprises information for determining a TA used for an uplink transmission with a target base station in a target coverage, the handover command is a Layer 1 handover command or a Layer 2 handover command, and the source coverage and the target coverage are identified by different Physical Cell identifiers; and in response to the handover command, determine the TA used for the uplink transmission with the target base station based on the information.

In one aspect, the processor is further configured to: determine uplink timing for the uplink transmission with the target base station in the target coverage based on the determined TA and an evaluation of a downlink reference signal from the target base station in the target coverage.

In one aspect, the processor is further configured to: perform the uplink transmission with the target base station in the target coverage at the determined uplink timing.

In one aspect, the information for determining the TA used for the uplink transmission with the target base station in the target coverage is based on an evaluated TA by the target base station in the target coverage.

In one aspect, the processor is further configured to, before receiving the handover command: receive from the source base station a trigger indicator to trigger an uplink transmission with the target base station in the target coverage; and perform the uplink transmission with the target base station in the target coverage in response to the trigger indicator, wherein the target base station evaluates the evaluated TA based on the uplink transmission in the target coverage and sends the evaluated TA to the source base station.

In one aspect, the trigger indicator is sent by one of DCI, MAC-CE or a Physical Downlink Control Channel (PDCCH) order.

In one aspect, the information for determining the TA used for the uplink transmission with the target base station in the target coverage indicates the evaluated TA or a relative TA indicating difference between a current TA for the source base station in the source coverage and the evaluated TA for the target base station in the target coverage.

In one aspect, the information for determining the TA used for the uplink transmission with the target base station in the target coverage indicates that the TA is the same as a current TA used for the source base station in the source coverage.

In one aspect, based on the information for determining the TA used for the uplink transmission with the target base station in the target coverage, the processor is configured to determine the TA as 0 in response to the handover command.

In one aspect, based on the information for determining the TA used for the uplink transmission with the target base station in the target coverage, the processor is configured to fall back to a legacy PRACH procedure.

In one aspect, the handover command is sent by DCI or MAC-CE.

In one aspect, the TA indicator is sent by DCI or MAC-CE.

In one aspect, the TA indicator is included in the handover command.

One other set of aspects provides a method, comprising: at a user equipment (UE), receiving via at least one radio a Time advance (TA) indicator together with a handover command from a source base station in a source coverage, wherein the handover command is a Layer 1 handover command or a Layer 2 handover command, the TA indicator comprises information for determining a TA used for an uplink transmission with a target base station in a target coverage, and the source coverage and the target coverage are identified by different Physical Cell identifiers; and in response to the handover command, determining the TA used for the uplink transmission with the target base station based on the information.

In one aspect, the method further comprises: determining uplink timing for the uplink transmission with the target base station in the target coverage based on the determined TA and an evaluation of a downlink reference signal from the target base station in the target coverage.

In one aspect, the method further comprises performing the uplink transmission with the target base station in the target coverage by using the determined TA.

In one aspect, the information for determining the TA used for the uplink transmission with the target base station in the target coverage is based on an evaluated TA by the target base station in the target coverage.

In one aspect, the method further comprises, before receiving the handover command: receiving from the source base station a trigger indicator to trigger an uplink transmission with the target base station in the target coverage; and performing the uplink transmission with the target base station in the target coverage in response to the trigger indicator, wherein the target base station evaluates the evaluated TA based on the uplink transmission in the target coverage and sends the evaluated TA to the source base station.

In one aspect, the trigger indicator is sent by one of DCI, MAC-CE or a Physical Downlink Control Channel (PDCCH) order.

In one aspect, the information for determining the TA used for the uplink transmission with the target base station in the target coverage indicates the evaluated TA or a relative TA indicating difference between a current TA for the source base station in the source coverage and the evaluated TA for the target base station in the target coverage.

In one aspect, the information for determining the TA used for the uplink transmission with the target base station in the target coverage indicates that the TA is the same as a current TA used for the source base station in the source coverage.

In one aspect, the method further comprises: based on the information for determining the TA used for the uplink transmission with the target base station in the target coverage, and determining the TA as 0 in response to the handover command.

In one aspect, the method further comprises: based on the information for determining the TA used for the uplink transmission with the target base station in the target coverage, falling back to a legacy PRACH procedure.

In one aspect, the handover command is sent by DCI or MAC-CE.

In one aspect, the TA indicator is sent by DCI or MAC-CE.

In one aspect, the TA indicator is included in the handover command.

One set of yet other aspects provides an apparatus for operating a user equipment (UE), comprising a processor configured to cause the UE to perform a method as mentioned above.

One set of yet other aspects provides a non-transitory computer-readable memory medium storing program instructions which, when executed at a user equipment (UE), cause the UE to perform a method as mentioned above.

One set of yet other aspects provides a computer program product, comprising program instructions which, when executed at a user equipment (UE), cause the UE to perform a method as mentioned above.

One set of yet other aspects provides a base station, comprising: at least one antenna; at least one radio coupled to the at least one antenna; and a processor coupled to the at least one radio. The cellular base station is configured to: send to a user equipment (UE) a Time advance (TA) indicator together with a handover command in a source coverage, wherein the handover command is a Layer 1 handover command or a Layer 2 handover command, the TA indicator comprises information for determining by the UE a TA used for an uplink transmission with a target base station in a target coverage, and the source coverage and the target coverage are identified by different Physical Cell identifiers.

In one aspect, the processor is configured to, before sending the handover command: send to the UE a trigger indicator to trigger the UE to perform an uplink transmission with the target base station in the target coverage; receive from target base station in the target coverage an evaluated TA, wherein the evaluated TA is determined by the target base station based on the uplink transmission performed by the UE in the target coverage.

In one aspect, the trigger indicator is sent by one of DCI, MAC-CE or a Physical Downlink Control Channel (PDCCH) order.

In one aspect, the information for determining by the UE a Time advance (TA) used for an uplink transmission with a target base station in a target coverage indicates the evaluated TA or a relative TA indicating difference between a current TA for the base station in the source coverage and the evaluated TA for the target base station in the target coverage.

In one aspect, the information for determining by the UE a Time advance (TA) used for an uplink transmission with a target base station in a target coverage indicates that the TA is the same as a current TA for the source base station in the source coverage.

In one aspect, the information for determining by the UE a Time advance (TA) used for an uplink transmission with a target base station in a target coverage indicates the UE to determine the TA as 0 in response to the handover command.

In one aspect, the information for determining by the UE a Time advance (TA) used for an uplink transmission with a target base station in a target coverage indicates the UE to fall back to a legacy PRACH procedure.

In one aspect, the handover command is sent by DCI or MAC-CE.

In one aspect, the TA indicator is sent by DCI or MAC-CE.

In one aspect, the TA indicator is included in the handover command.

One set of yet other aspects provides a method, comprising: at a base station, sending to a user equipment (UE) a Time advance (TA) indicator together with a handover command in a source coverage, wherein the handover command is a Layer 1 handover command or a Layer 2 handover command, and the TA indicator comprises information for determining by the UE a Time advance (TA) used for an uplink transmission with a target base station in a target coverage, and the source coverage and the target coverage are identified by different Physical Cell identifiers.

In one aspect, the method further comprises: sending to the UE a trigger indicator to trigger the UE to perform an uplink transmission with the target base station in the target coverage; and receiving from target base station in the target coverage an evaluated TA, wherein the evaluated TA is determined by the target base station based on the uplink transmission performed by the UE in the target coverage.

In one aspect, the trigger indicator is sent by one of DCI, MAC-CE or a Physical Downlink Control Channel (PDCCH) order.

In one aspect, the information for determining by the UE a Time advance (TA) used for an uplink transmission with a target base station in a target coverage indicates the evaluated TA or a relative TA indicating difference between a current TA for the base station in the source coverage and the evaluated TA for the target base station in the target coverage.

In one aspect, the information for determining by the UE a Time advance (TA) used for an uplink transmission with a target base station in a target coverage indicates that the TA is the same as a current TA used for the source base station in the source coverage.

In one aspect, the information for determining by the UE a Time advance (TA) used for an uplink transmission with a target base station in a target coverage indicates the UE to determine the TA as 0 in response to the handover command.

In one aspect, the information for determining by the UE a Time advance (TA) used for an uplink transmission with a target base station in a target coverage indicates the UE to fall back to a legacy PRACH procedure.

In one aspect, the handover command is sent by DCI or MAC-CE.

In one aspect, the TA indicator is sent by DCI or MAC-CE.

In one aspect, the TA indicator is included in the handover command.

One set of yet other aspects provides an apparatus for operating a base station, comprising: a processor configured to cause the base station to perform a method as described above.

One set of yet other aspects provides a non-transitory computer-readable memory medium storing program instructions which, when executed at a base station, cause the base station to perform a method as described above.

One set of yet other aspects provides a computer program product, comprising program instructions which, when executed at a base station, cause the base station to perform a method as described above.

One set of yet other aspects provides a base station, comprising: at least one antenna; at least one radio coupled to the at least one antenna; and a processor coupled to the at least one radio. The processor is configured to: receive an uplink transmission in a target coverage from a user equipment (UE), the uplink transmission is performed by the UE before the UE receive a handover command from a source base station in a source coverage to be handover from the source coverage to the target coverage, wherein the handover command is a Layer 1 handover command or a Layer 2 handover command and the source coverage and the target coverage are identified by different Physical Cell identifiers; evaluate a Time advance (TA) based on the uplink transmission in the target coverage, the TA is used for an uplink transmission by the UE with the base station in the target coverage in response to receiving the handover command; and send the evaluated TA to the source base station in the source coverage.

In one aspect, the evaluated TA is sent to the source base station by a new message over Xn interface.

In one aspect, the received uplink transmission in the target coverage is one of the following: aperiodic SRS transmission; semi-persistent SRS transmission; or PRACH preamble transmission.

In one aspect, the processor is further configured to: receive an uplink transmission from the UE at an uplink timing, wherein the uplink transmission is sent by the UE in response to a handover command, and the uplink timing is determined based at lease a part on the evaluated TA.

One set of yet other aspects provides a method, comprising: at a base station, receiving an uplink transmission in a target coverage from a user equipment (UE), the uplink transmission is performed by the UE before the UE receive a handover command from a source base station in a source coverage to be handover from the source coverage to the target coverage, wherein the handover command is a Layer 1 handover command or a Layer 2 handover command and the source coverage and the target coverage are identified by different Physical Cell identifiers; evaluating a Time advance (TA) based on the uplink transmission in the target coverage, the TA is used for an uplink transmission by the UE with the base station in the target coverage in response to receiving the handover command; and sending the evaluated TA to the source base station in the source coverage.

In one aspect, the evaluated TA is sent to the source base station by a new message over Xn interface.

In one aspect, the received uplink transmission in the target coverage is one of the following: aperiodic SRS transmission; semi-persistent SRS transmission; or PRACH preamble transmission.

In one aspect, the method further comprises: receiving an uplink transmission from the UE at an uplink timing, wherein the uplink transmission is sent by the UE in response to a handover command; and the uplink timing is determined based at lease a part on the evaluated TA.

One set of yet other aspects provides an apparatus for operating a base station, comprising a processor configured to cause the base station to perform a method as described above.

One set of yet other aspects a non-transitory computer-readable memory medium storing program instructions which, when executed at a base station, cause the base station to perform a method as described above.

One set of yet other aspects a computer program product, comprising program instructions which, when executed at a base station, cause the base station to perform a method as described above.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In one aspect, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In one aspect, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A User Equipment (UE), comprising:
a memory; and
a baseband processor coupled to the memory, and when executing instructions stored in the memory, configured to cause the UE to:
receive a trigger indicator from a source base station in a source coverage;
in response to the trigger indicator, cause transmission of a first uplink (UL) transmission to a target base station in a target coverage that has a different Physical Cell Identifier than the source coverage;
receive a Time Advance (TA) indicator together with a handover command in Layer 1 or Layer 2 from the source base station, wherein the handover command indicates handover from the source base station to the target base station, wherein the TA indicator is based on an evaluated TA computed by the target base station based on the first UL transmission; and
in response to the handover command, send a second uplink transmission to the target base station based on the TA indicator.

2. The UE of claim 1, wherein the baseband processor is further configured to:
determine uplink timing for the second uplink transmission based on the TA and an evaluation of a downlink reference signal from the target base station.

3. The UE of claim 1, wherein the TA indicator indicates a specific TA value.

4. The UE of claim 1, wherein the baseband processor is further configured to cause the UE to, before receiving the handover command:
in response to the trigger indicator, transmit to the target base station a Physical Random Access Channel (PRACH) preamble, wherein the TA indicator received from the source base station is based on an evaluated TA that is determined by the target base station based on the PRACH preamble.

5. The UE of claim 4, wherein the baseband processor is further configured to cause the UE to, before receiving the handover command:
receive a Physical Downlink Control Channel (PDCCH) order from the source base station; and
transmit the PRACH preamble in response to the PDCCH order.

6. The UE of claim 1, wherein the TA indicator includes a relative TA indicating difference between a current TA for the source base station and the TA for the target base station.

7. The UE of claim 1, wherein the TA indicator indicates that the TA is the same as a current TA used for the source base station.

8. The UE of claim 1, wherein based on the TA indicator not being included in the handover command, the processor is configured to determine the TA as 0.

9. The UE of claim 1, wherein the TA indicator is received together with the handover command in a Medium Access Control-Control Element (MAC-CE).

10. A method, comprising:
receiving a trigger indicator from a source base station in a source coverage;
in response to the trigger indicator, transmitting a first uplink (UL) transmission to a target base station in a target coverage that has a different Physical Cell Identifier than the source coverage;
receiving a Time Advance (TA) indicator together with a handover command in Layer 1 or Layer 2 from the source base station, wherein the handover command indicates handover from the source base station to the target base station, wherein the TA indicator is based on an evaluated TA computed by the target base station based on the UL transmission; and
in response to the handover command, sending a second uplink transmission to the target base station based on the TA indicator.

11. The method of claim 10, wherein the TA indicator indicates that the TA is the same as a current TA used for the source base station.

12. The method of claim 10, wherein the method further comprises:
based on the TA indicator, determining the TA as 0.

13. The method of claim 10, wherein the trigger indicator is received by way of a Physical Downlink Control Channel (PDCCH) order.

14. The method of claim 10, wherein the handover command is received by Downlink Control Information (DCI) or Medium Access Control-Control Element (MAC-CE).

15. The method of claim 10, wherein the TA indicator is received by Downlink Control Information (DCI) or Medium Access Control-Control Element (MAC-CE).

16. The method of claim 10, wherein the TA indicator is included with the handover command in a Medium Access Control-Control Element (MAC-CE).

17. The method of claim 10, further comprising, before receiving the handover command:

transmitting to the target base station a Physical Random Access Channel (PRACH) preamble, wherein the TA indicator received from the source base station is based on an evaluated TA, which is determined by the target base station based on the PRACH preamble.

18. The method of claim 17, further comprising, before receiving the handover command:

receiving a Physical Downlink Control Channel (PDCCH) order from the source base station, wherein the PRACH preamble is transmitted in response to the PDCCH order.

19. A processor configured to, when executing instructions stored in a memory, perform operations comprising:

receiving a trigger indicator from a source base station;

in response to the trigger indicator, causing transmission of an uplink (UL) transmission to a target base station, wherein the target base station computes an evaluated TA based on the UL transmission and sends the evaluated TA to the source base station;

receiving a Time Advance (TA) indicator together with a handover command in Layer 1 or Layer 2 from the source base station in a source coverage, wherein the handover command indicates handover from the source base station to the target base station, which is in a target coverage that has a different Physical Cell Identifier than the source coverage, wherein the TA indicator is based on the evaluated TA; and in response to the handover command, output a message for uplink transmission to the target base station using a TA determined based on the TA indicator.

20. The processor of claim 19, wherein the trigger indicator comprises Downlink Control Information (DCI).

21. The processor of claim 19, wherein the trigger indicator comprises a Medium Access Control-Control Element (MAC-CE).

22. The processor of claim 19, wherein the trigger indicator comprises a Physical Downlink Control Channel (PDCCH) order.

23. The processor of claim 19, wherein the TA indicator indicates the evaluated TA.

24. The processor of claim 19, wherein the handover command and the TA indicator are received in Downlink Control Information (DCI).

25. The processor of claim 19, wherein the handover command and the TA indicator are received in a Medium Access Control-Control Element (MAC-CE).

26. The processor of claim 19, wherein the operations further comprise, in response to the trigger indicator:

causing transmission of a Physical Random Access Channel (PRACH) preamble for transmission to the target base station, wherein the evaluated TA is determined by the target base station based on and in response to the PRACH preamble.

27. The processor of claim 26, wherein the trigger indicator comprises a Physical Downlink Control Channel (PDCCH) order from the source base station, wherein the PRACH preamble is transmitted in response to the PDCCH order.

\* \* \* \* \*